Figure 1:
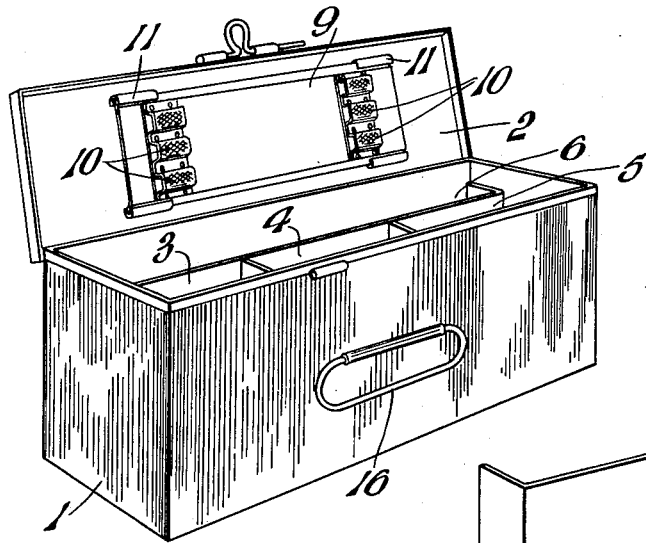

Dec. 1, 1936. F. GLUCKSTEIN 2,062,973
CONTAINER FOR FIRST AID EQUIPMENT
Original Filed Sept. 12, 1935 2 Sheets-Sheet 1

Inventor:
Francesca Gluckstein
By Sager & Malcolm
Attorneys.

Dec. 1, 1936. F. GLUCKSTEIN 2,062,973
CONTAINER FOR FIRST AID EQUIPMENT
Original Filed Sept. 12, 1935 2 Sheets-Sheet 2

Patented Dec. 1, 1936

2,062,973

UNITED STATES PATENT OFFICE 2,062,973

CONTAINER FOR FIRST AID EQUIPMENT

Francesca Gluckstein, Regent's Park, London, England

Original application September 12, 1935, Serial No. 40,212. Divided and this application April 1, 1936, Serial No. 72,017. In Great Britain December 18, 1934

3 Claims. (Cl. 206—12)

This invention relates to containers for first aid equipment and has for its object to provide a container which will neatly house all the necessary devices i. e. bandages, instruments, and the like in a manner which will be hygienic and convenient.

This application is a division of my copending application, Serial No. 40,212, filed September 12, 1935.

The invention consists of a container for first aid equipment comprising a container body divided into a plurality of compartments by a removable partitioning structure consisting of a transverse dividing wall, a shorter spacing element at each end of it, and spacing elements situated intermediately of the ends, a removable panel, fitted with clips for carrying instruments, sliding into clips inside the lid, and handles attached to the front of the container and to the lid, as shown in the drawings.

The provision of two handles one constituting the usual carrying handle attached to the lid and the other a handle attached to the front wall enables the container to be readily withdrawn from a housing compartment which it substantially fits. The container is specially adapted for use for insertion into panel or wall housing compartments as described in the specification of my co-pending application Serial No. 40,212.

Figure 2:
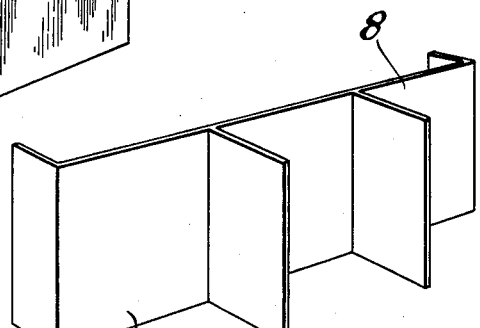
Figure 3:
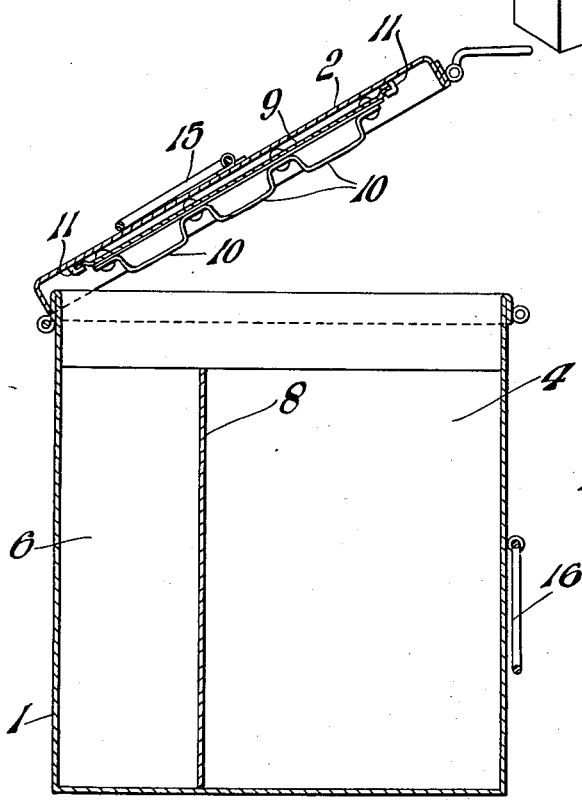
Figure 4:
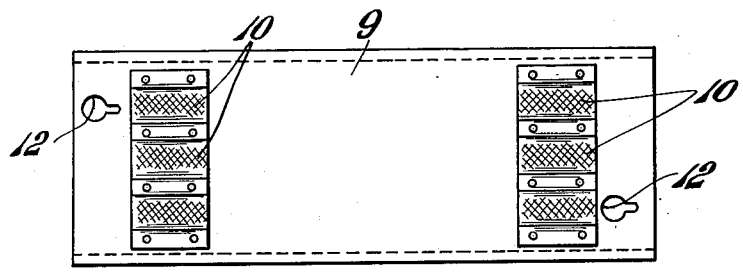
Figure 5:
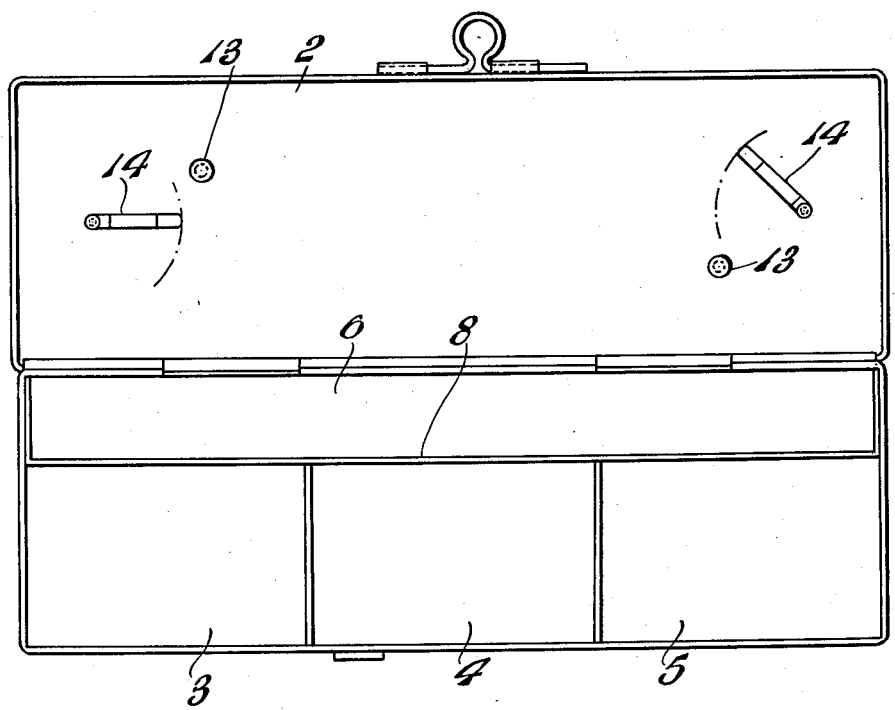

In order that the invention may be readily understood reference is hereby made to the accompanying drawings wherein Figure 1 is a perspective view of the container, Figure 2 is a similar view of the removable partitioning structure, Figure 3 is a vertical section of the container and its lid, Figure 4 is a plan view of the removable instrument carrying panel and Figure 5 is a plan view of the container with the lid in fully open position.

Referring to these drawings the numeral 1 designates the body of the box or container and 2 designates the hinged lid. The body of the container is divided into compartments 3, 4, 5 and 6 by a removable partitioning structure 8 shown clearly by Figure 2. Removably attached to the lid 2 I provide an instrument carrying panel 9 which is provided with loops or other suitable fitments 10 for holding the instruments against accidental displacement.

This instrument panel can be removably held to the inner side of the lid by clips 11 as indicated in Figure 1 or by means of key hole slots 12 co-operating with headed studs 13 as shown in Figure 5 this figure also showing pivoted fastenings 14 for locking the panel in position. In addition to the usual carrying handle 15 I provide a handle 16 for enabling the container to be drawn out of a compartment which it substantially fits formed in a recess in a wall or panel.

By means of the foregoing arrangement bandages, sterilizers and medicaments can be carried in their separate compartments and when required for use the whole of the instruments can be removed without disarrangement and withdrawn from the restraining fitments on the removable panel as required for use. The removability of the panel and the partitioning facilitates the cleaning of the box and its parts.

What I claim and desire to secure by Letters Patent is:—

1. A first-aid equipment container comprising a body portion, a lid hinged to said body portion, a rigid panel having a plurality of securing means thereon for holding surgical instruments in exposed and quickly detachable condition close against the panel and substantially rigid therewith, and a plurality of rigid holders associated with different portions of the panel readily engageable and releasable by movement of the panel in a direction substantially parallel to the plane of the lid mounted on the inside of the lid for removably holding the said panel thereon, whereby said panel may be readily removed to permit handling of the instruments or sterilization of the panel and the instruments.

2. In a first-aid equipment container as claimed in claim 1, said holders comprising headed pins on the inside of said lid, keyhole slots in said panel adapted to cooperate with said pins, and clips on the inside of the lid adapted to engage the panel to hold it in position.

3. In a first-aid equipment container as claimed in claim 1, a partitioning structure removable as a single unit dividing the interior of said compartment into a plurality of compartments, a carrying handle attached to said lid, and a withdrawing handle attached to one of the side walls of the body portion.

FRANCESCA GLUCKSTEIN.